United States Patent
Linder et al.

(10) Patent No.: US 7,679,877 B2
(45) Date of Patent: Mar. 16, 2010

(54) METHOD FOR OPERATING A TRANSMISSION LINE AND CORRESPONDINGLY CONSTRUCTED DEVICE

(75) Inventors: Thomas Linder, Spittal (AT); Bernhard Zojer, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/951,784

(22) Filed: Dec. 6, 2007

(65) Prior Publication Data

US 2008/0137258 A1      Jun. 12, 2008

(30) Foreign Application Priority Data

Dec. 6, 2006  (DE) ................. 10 2006 057 579

(51) Int. Cl.
| | |
|---|---|
| H01C 7/12 | (2006.01) |
| H02H 1/00 | (2006.01) |
| H02H 1/04 | (2006.01) |
| H02H 3/22 | (2006.01) |
| H02H 9/06 | (2006.01) |
| H02H 3/00 | (2006.01) |
| H02H 9/04 | (2006.01) |
| H02H 3/08 | (2006.01) |
| H02H 9/02 | (2006.01) |

(52) U.S. Cl. ............... 361/119; 361/79; 361/91.1; 361/93.1; 361/93.7; 361/93.9

(58) Field of Classification Search ............. None
See application file for complete search history.

(56) References Cited

U.S. PATENT DOCUMENTS

| | | | | |
|---|---|---|---|---|
| 5,537,287 | A * | 7/1996 | Dreier ................ | 361/119 |
| 5,808,849 | A | 9/1998 | Storbeck | |
| 6,525,919 | B2 * | 2/2003 | Wood ................ | 361/93.9 |
| 6,885,745 | B1 * | 4/2005 | Handforth et al. ...... | 379/412 |
| 7,054,124 | B2 * | 5/2006 | Blechschmidt et al. .. | 361/91.1 |
| 7,092,517 | B2 | 8/2006 | Pruecklmayer et al. | |
| 2004/0169985 | A1 | 9/2004 | Gropl | |

FOREIGN PATENT DOCUMENTS

| | | |
|---|---|---|
| DE | 281 331 A7 | 8/1990 |
| DE | 44 23 798 A1 | 1/1996 |
| DE | 100 45 015 A1 | 3/2002 |
| DE | 102 41 354 A1 | 3/2004 |

* cited by examiner

Primary Examiner—Albert W Paladini
Assistant Examiner—Dharti H Patel
(74) Attorney, Agent, or Firm—Slater & Matsil, L.L.P.

(57) ABSTRACT

A method and a device for operating a transmission line are provided. The device includes a line driver circuit and a protective circuit. The line driver circuit converts an input signal of the device into a current or a voltage for the transmission line while the protective circuit prevents an overvoltage and/or an overcurrent on the transmission line. The line driver circuit and the protective circuit are integrated in a common package.

23 Claims, 4 Drawing Sheets

PRIOR ART

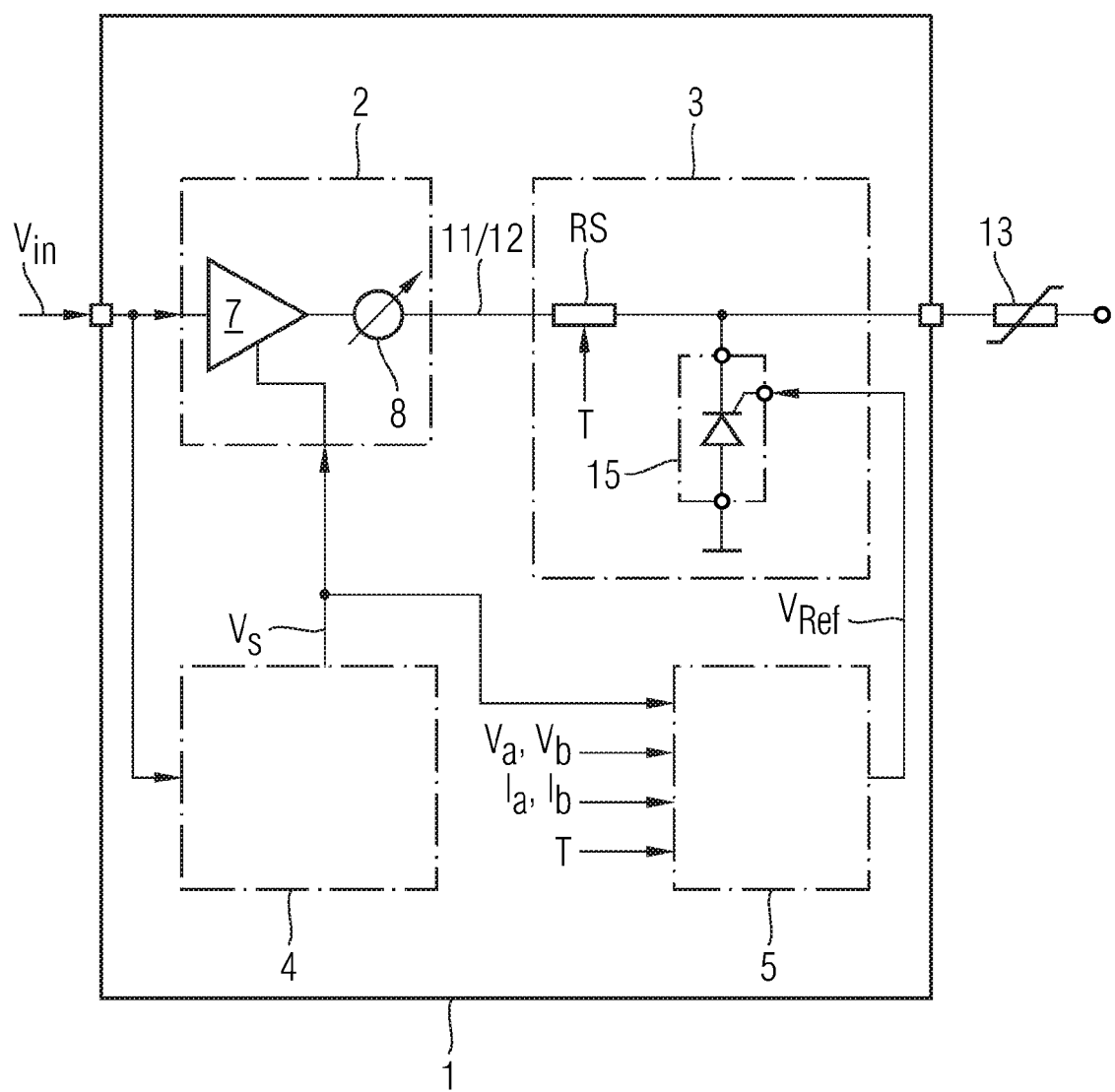

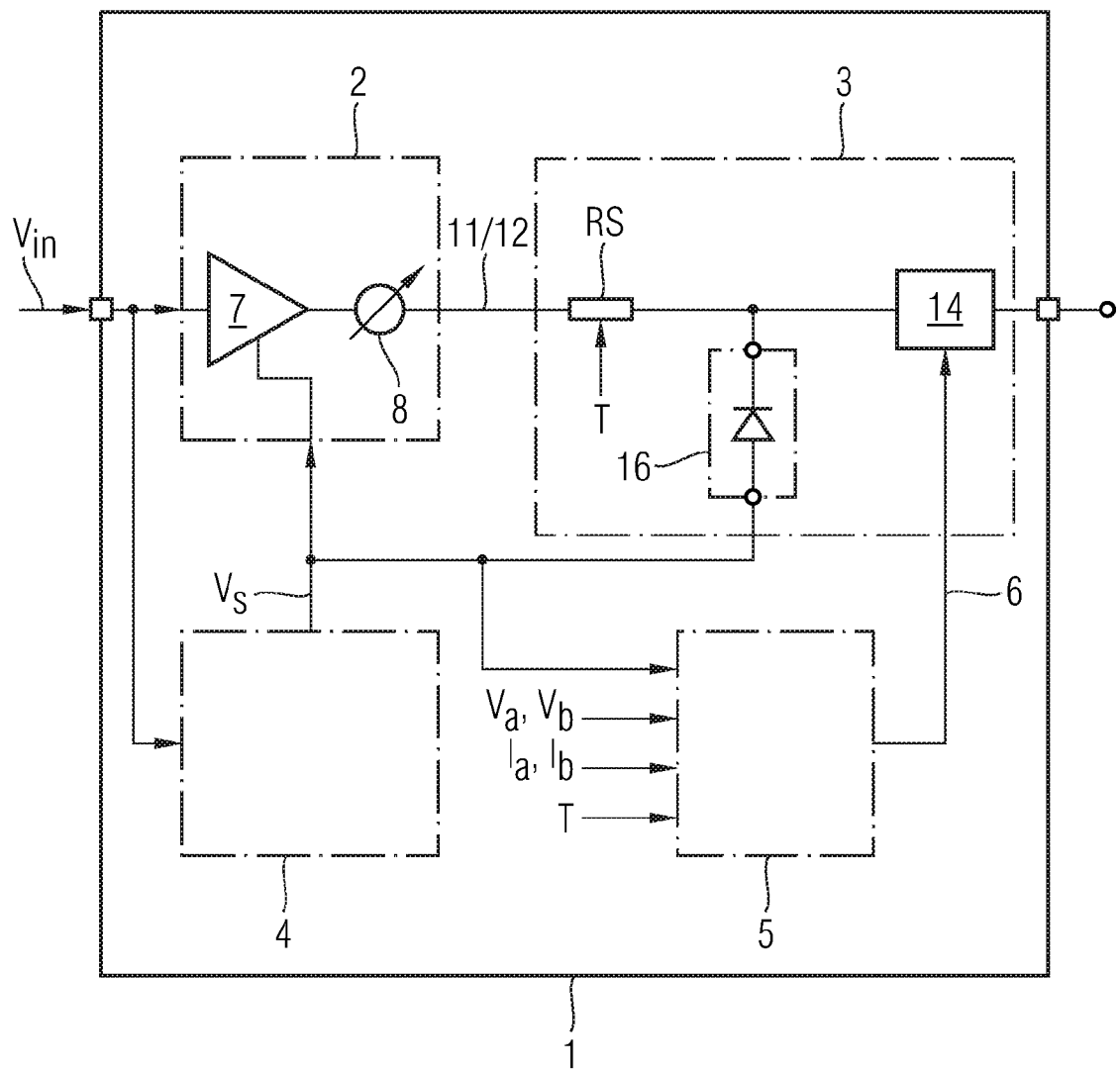

METHOD FOR OPERATING A TRANSMISSION LINE AND CORRESPONDINGLY CONSTRUCTED DEVICE

This application claims priority to German Patent Application 10 2006 057 579.2, which was filed Dec. 6, 2006 and is incorporated herein by reference.

TECHNICAL FIELD

Embodiments of the present invention relate to a method to protect a transmission line interface from an overvoltage and/or an overcurrent, and to a device which is arranged to carry out this method.

BACKGROUND

A physical interface for a transmission line, in particular a telephone line, conventionally comprises a plurality of integrated circuits that are usually constructed using different technologies, as well as a number of passive components, so the interface is elaborate with respect to production costs and space requirements.

BRIEF DESCRIPTION OF THE DRAWINGS

The present invention will be described in more detail hereinafter with reference to the accompanying drawings with the aid of preferred embodiments.

FIG. 3 shows a second embodiment according to the invention of a device for operating a transmission line; and FIG. 4 shows a third embodiment according to the invention of a device for operating a transmission line.

DETAILED DESCRIPTION OF ILLUSTRATIVE EMBODIMENTS

Figure 1:
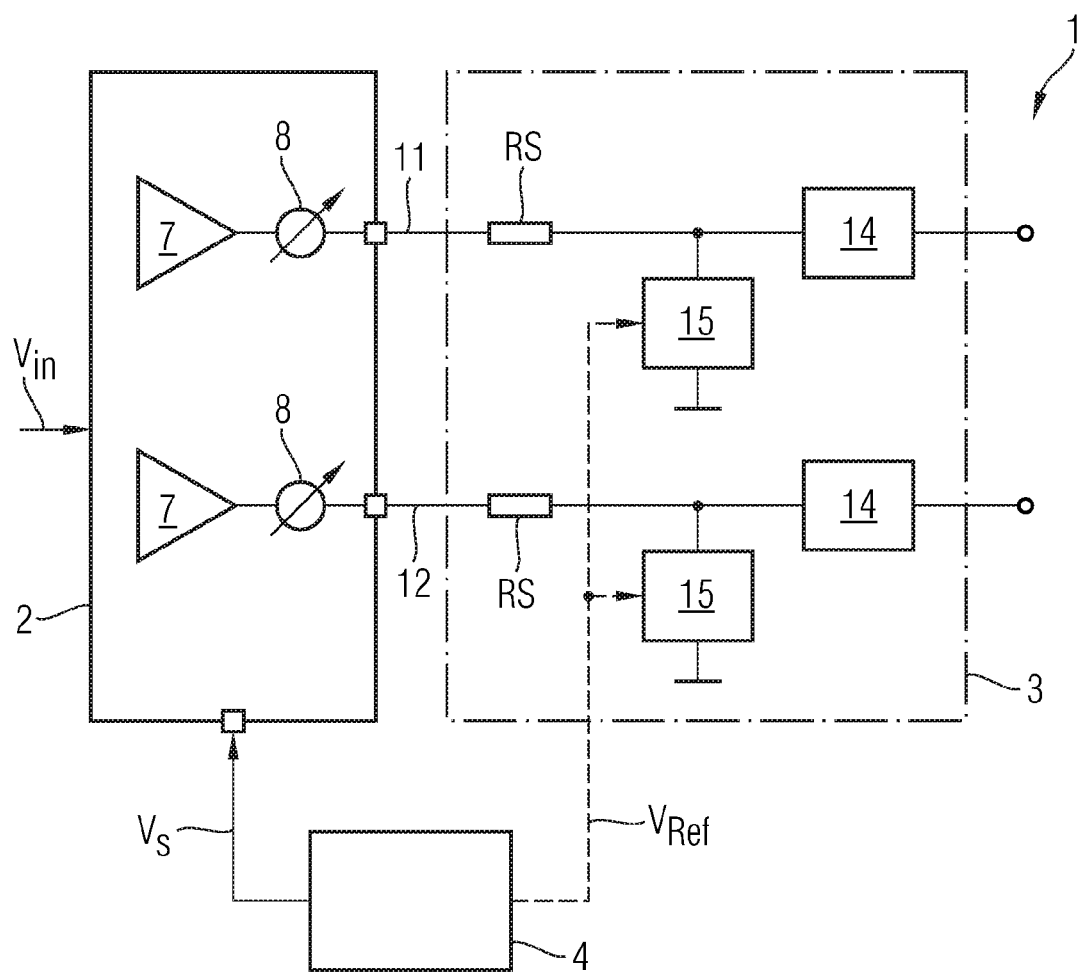
FIG. 1 shows a conventional interface for a transmission line.

FIG. 1 shows a conventional interface 1 for a telephone line which comprises an A-wire 11 and a B-wire 12. An input voltage $V_{in}$ of the interface 1 is supplied by a codec (not shown) which usually operates digitally and comprises a digital-analog converter which converts the data for transmission via the telephone line 11, 12 into the analog input voltage $V_{in}$ for the interface 1. Although it is not shown in FIG. 1 the interface 1 forwards an analog signal received via the telephone line 11, 12 to the codec which converts this analog signal into a digital signal.

The interface 1 comprises a line driver circuit 2 which is often also called an SLIC (Subscriber Line Interface Circuit), a supply circuit 4 which supplies the line driver circuit with a supply voltage $V_S$ and a protective circuit 3 which prevents an overvoltage and/or an overcurrent on the telephone line 11, 12.

In the line driver circuit 2 a voltage is applied to the A-wire 11 or the B-wire 12 as a function of the input voltage $V_{in}$ for both the A-wire 11 and the B-wire 12 by means of a respective voltage amplifier 7, so a voltage difference between the voltage on the A-wire 11 and the voltage on the B-wire 12 is proportional to the input voltage $V_{in}$. An ammeter 8 is located on both the A-wire 11 and on the B-wire 12 and measures the current on the A-wire 11 or B-wire 12. The line driver circuit 2 operates in high-voltage technology, so the associated supply voltage $V_S$ is in a range between about 50 and about 200 volts.

The protective circuit 3, which is intended to protect an interface of the telephone line 11, 12 against interference, for example, by lightning or power crosses, comprises a respective current limiter 14 and a voltage limiter 15 for both the A-wire 11 and the B-wire 12. The two voltage limiters 15 are supplied with a reference voltage $V_{Ref}$ of the supply circuit 4 and are arranged in such a way that they discharge an overvoltage on the corresponding wire 11, 12 to ground if the voltage on the corresponding wire 11, 12 is greater than the reference voltage $V_{Ref}$. The current limiters 14 are arranged in such a way that their resistance value increases as the current increases, so that, as a result, the current through the corresponding wire 11, 12 cannot increase beyond a maximum value. Finally the protective circuit 3 comprises an ohmic resistor RS on each wire 11, 12.

The line driver circuit 2 and the individual elements of the protective circuit 3, i.e., the ohmic resistors RS, the current limiters 14 and the voltage limiters 15, are conventionally generally created independently of each other, so they have to be adjusted to each other and to the requirements in the system, and this often makes additional, usually passive, components necessary for this adjustment. The situation can by all means occur where the individual components of the interface 1 have been manufactured using different technologies, and this makes integration, which often only takes place on the corresponding linecard, difficult.

According to an inventive embodiment a device is proposed to operate a transmission line or communications line. The device comprises a line driver circuit or an SLIC and a protective circuit. The line driver circuit is arranged in such a way that it adjusts a current and/or a voltage on the transmission line as a function of an input signal. The protective circuit is arranged in such a way that it discharges an overvoltage on the transmission line and/or prevents a current on the transmission line from becoming greater than a maximum value. The line driver circuit and the protective circuit are integrated in a common package. A package is taken to mean one or more raw chip(s), made from a semiconductor material, which is/are accommodated in the same housing. The raw chips can be arranged side by side and/or one above the other inside the package. Sometimes the term 'multichip' is also used for the term 'package' in order to indicate that the device comprises a plurality of chips that is integrated in a package. A raw chip is taken to mean only a silicon chip without a housing, in contrast to a semiconductor chip which comprises a raw chip with a housing.

By integrating the line driver circuit and the protective circuit in a package parameters for controlling the protective circuit (for example, temperature inside the package, voltage of the A-wire or B-wire with respect to ground, current on the A-wire or B-wire) can be determined and used more easily than if the line driver circuit and the protective circuit comprise a plurality of components, as is conventionally the case.

According to a further inventive embodiment the device for operating the transmission line, which in particular includes an A-wire and a B-wire, can comprise sensor means, so with the aid of these sensor means the device is capable of determining or detecting at least one parameter from a group of parameters. This group of parameters comprises the following parameters in this case:

One or more voltage(s) measured with respect to the transmission line. These can include a voltage between the A-wire and ground and a voltage between the B-wire and ground.

One or more current(s) measured on the transmission line. These can include a current on the A-wire and a current on the B-wire. These currents also include longitudinal currents, i.e., currents which flow in the same direction on both wires, and transversal currents, i.e., currents between the wires of the transmission line.

One or more power loss(es) which occur due to a DC supply of the transmission line.

A temperature in the package. Since both the line driver circuit and the protective circuit are integrated in the same package, the temperature measured in the package advantageously applies to the line driver circuit and the protective circuit.

A parasitic current in the package. A parasitic current is taken to mean a current which discharges into a substrate and in the event of a fault (in the case of an overvoltage or an overcurrent) has a greater current flow value than in a correct case (good case).

According to the embodiment described here the protective circuit is arranged in such a way that it prevents the overvoltage on the transmission line and/or excessive current on the transmission line as a function of one or more of these parameter(s) by, for example, low-resistance switching of a connection between the A-wire and ground or a connection between the B-wire and ground as a function of one or more of these parameter(s), so an overvoltage on the corresponding wire is discharged. In the same way a current limiter of the A-wire or B-wire can be switched as a function of one or more of these parameter(s), so the current on the A-wire or the B-wire can be kept under a maximum value in this way.

Since the line driver circuit and the protective circuit are integrated in one package, these parameters mentioned above may be determined very easily compared with conventional devices for operating a transmission line and can also be forwarded very easily to the protective circuit via connection lines inside the package. Owing to the fact that the line driver circuit and the protective circuit are integrated in a common package the individual parameters are, moreover, more meaningful than if the line driver circuit and the protective circuit are constructed from a plurality of separate components, as is conventionally the case. For example according to the invention the temperature in the package applies to the line driver circuit and the protective circuit since they are both integrated in the same package. By contrast the temperature would conventionally have to be measured per separate component to recognize whether a maximum temperature has been exceeded in one component.

According to a further embodiment the device according to the invention can also comprise a supply circuit which together with the line driver circuit and the protective circuit is integrated in a common package. The supply circuit is arranged in such a way that it supplies the line driver circuit with a supply voltage.

As the supply voltage is also integrated in the package the supply voltage can accordingly also very easily be used as a parameter so the protective circuit activates the voltage limitation and/or the current limitation as a function of this supply voltage to prevent an overvoltage and/or an overcurrent with respect to the transmission line.

Since on the basis of parameters within the group of parameters protective elements (current limiters and/or voltage limiters) of the protective circuit can be controlled significantly more intelligently than in the case of conventional interfaces, the protective elements can also be dimensioned significantly smaller and so is less expensive.

In a further embodiment according to the invention the supply circuit comprises a DC/DC converter or a voltage controller which regulates the supply voltage as a function of an input voltage which corresponds to the input signal that is to be applied to the transmission line. The DC/DC converter is arranged in such a way that the supply voltage is never greater than the voltage between the transmission line and ground, i.e., the voltage between the A-wire and ground or the voltage between the B-wire and ground, by more than a predetermined voltage value. This predetermined voltage value is in particular between about 5 volts and about 10 volts. In other words the DC/DC converter ensures that in a correct case (there is no overvoltage) the actual supply voltage, with which the line driver circuit is provided, is never greater than the sum of the predetermined voltage value and the actual voltage between the transmission line and ground. The supply voltage therefore varies in this embodiment in a similar manner to the input voltage.

In a likewise preferred embodiment the device is integrated on a single semiconductor chip. In other words, the entire device is located on the same semiconductor chip or die.

Since the integration of the device on a single semiconductor chip signifies a further, more comprehensive integration compared with integration of the device in a common package, the advantages discussed above for the embodiments in which the device is integrated in the common package also apply in a more or less reinforced manner for the embodiment described here in which the device is integrated in a single semiconductor chip. This means that owing to the more comprehensive integration the parameters described above, such as the temperature on the semiconductor chip and the parasitic current in the semiconductor chip, describe a situation, in which there is an overvoltage or an overcurrent on the transmission line, even better than if the device is integrated in a package.

Since the device is integrated in a single package or even in a single semiconductor chip, the number of components required for the device is significantly smaller than in conventional interfaces by one component. The space requirement and the production costs for the device are therefore significantly lower than for a conventional device.

According to another embodiment according to the invention, a method for operating a transmission line is provided. This method converts an input signal into a current or a voltage for the transmission line and prevents an overvoltage and/or overcurrent on the transmission line. For this purpose a line driver circuit and a protective circuit are used, wherein the line driver circuit converts the input signal into the current or the voltage, i.e., into a current flowing on the transmission line or a voltage applied with respect to the transmission line. The protective circuit discharges a possible overcurrent on the transmission line and/or limits a current flowing on the transmission line in such a way that a maximum value is not exceeded. To better protect a transmission line interface from the overvoltage or overcurrent than is conventionally the case the line driver circuit and the protective circuit are integrated in a package.

In a further embodiment according to the invention the overvoltage and/or overcurrent on the transmission line is recognized and discharged or limited as a function of at least one parameter, which is selected from the group of parameters already indicated above.

The advantages of this embodiment match the advantages which have been described above in the discussion of the corresponding embodiment of the device according to the invention, for which reason they will not be repeated here.

According to a further embodiment according to the invention a transmission system is provided which comprises a device for operating a transmission line. This device matches the device according to the invention described above, so the transmission system according to the invention has the same advantages.

A transmission system, is taken to mean a telephone system, for example, with which a plurality of communication subscribers can communicate via a communications network which comprises a plurality of transmission lines. A device according to the invention is disposed with each communications subscriber in this case.

Preferred embodiments according to the invention, which are illustrated in the drawings, will be described in detail hereinafter.

Figure 2:
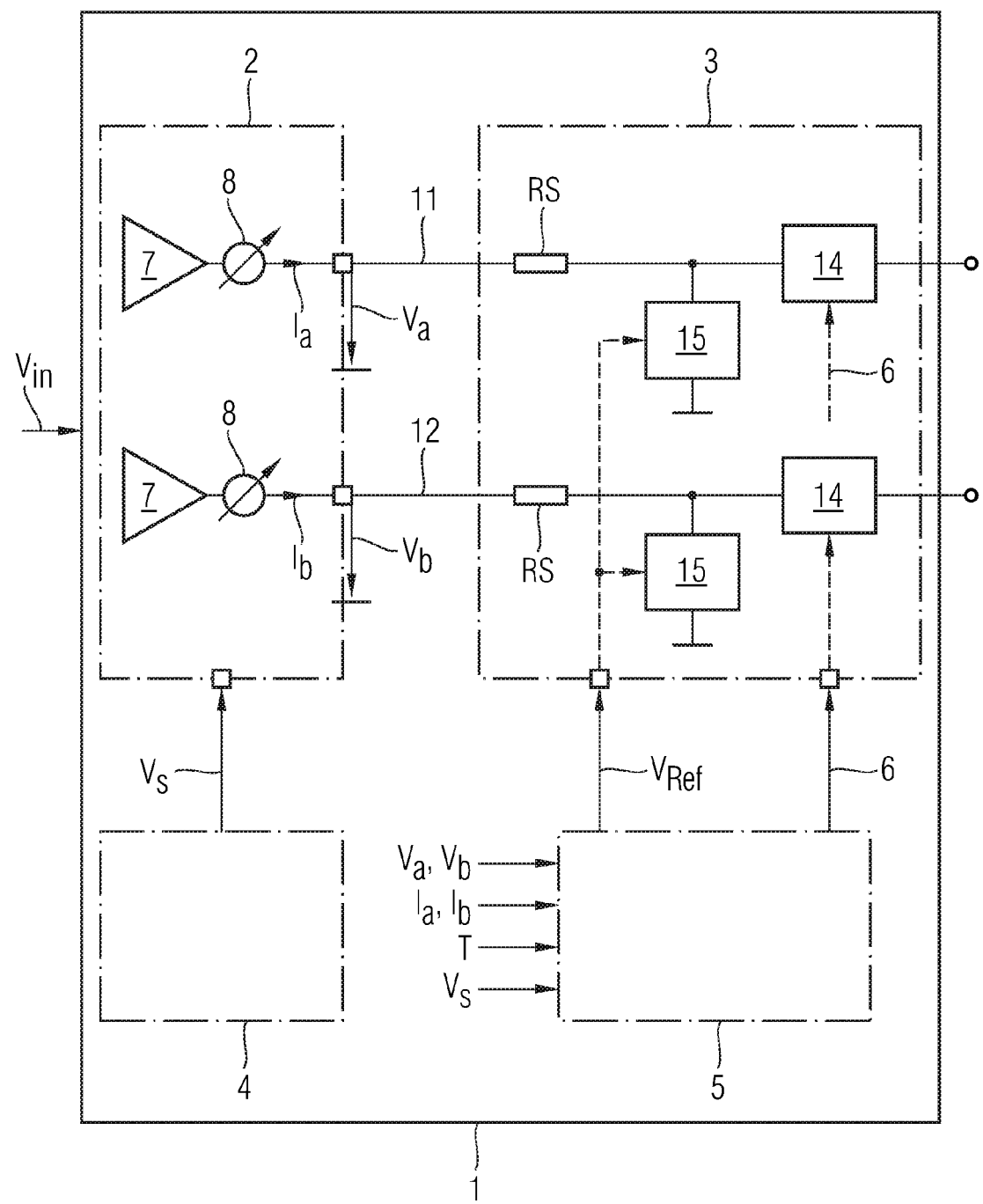
FIG. 2 shows a first embodiment according to the invention of a device for operating a transmission line.

FIG. 2 shows a first preferred embodiment according to the invention of a telephone line interface or communications line interface 1 which is integrated on a semiconductor chip. As functional blocks of the semiconductor chip the communications line interface 1 comprises an SLIC 2, a protective circuit 3, a supply circuit 4 and a protective controller 5. The SLIC 2 comprises a respective voltage amplifier 7 for both the A-wire 11 and the B-wire 12, with the aid of which amplifier a voltage $V_a$ or $V_b$ is applied to the A-wire 11 or B-wire 12 as a function of the input voltage $V_{in}$. The SLIC 2 therefore operates as a low-resistance voltage source and in a correct case (there is no overcurrent) allows a maximum current $I_{lim, max}$ to flow on the A-wire 11 or B-wire 12. There is an ammeter 8, which measures a current $I_a$ or $I_b$ on the A-wire 11 or B-wire 12, on both the A-wire 11 and B-wire 12.

The supply circuit 4 supplies the SLIC 2 with a supply voltage $V_S$.

The protective circuit 3 comprises a respective resistor RS for both the A-wire 11 and B-wire 12 to limit the current $I_a$ or $I_b$ through the SLIC 2. This resistor RS has a positive temperature coefficient, so the current $I_a$ or $I_b$ is lowered all the more the higher the temperature T in the communications line interface 1.

The protective circuit 3 also comprises a respective voltage limiter 15 and a current limiter 14 for the A-wire 11 and the B-wire 12. The voltage limiters 15 are controlled by a reference voltage $V_{Ref}$ of the protective controller 5 and are constructed in such a way that they have low-resistance if the voltage $V_a$ between the A-wire 11 and ground or the voltage $V_b$ between the B-wire 12 and ground is greater than the reference voltage $V_{Ref}$, so the overvoltage is discharged in this case. The current limiter 14 is similarly controlled by a control signal 6 of the protective controller 5. If the control signal 6 is at a predetermined value the current limiter 14 is switched to high-resistance, so the current $I_a$ or $I_b$ is kept below a maximum value.

The protective controller 5 is constructed in such a way that it forms a reference voltage $V_{Ref}$ and the control signal 6 as a function of the following input parameters:

$V_a, V_b$
$I_a, I_b$
T
$V_S$

FIG. 3 shows a second embodiment according to the invention of a communications line interface 1. It is noted in this connection that for reasons of simplicity or symmetry FIGS. 3 and 4 show the communications line only as an A-wire 11 or B-wire 12. Since the basic construction of the second embodiment is identical to the construction of the first embodiment in FIG. 2 only the differences will be discussed hereinafter.

In the second embodiment the input voltage $V_{in}$ is also an input parameter of the supply circuit 4. The supply circuit 4 comprises an integrated DC/DC converter (not shown) which, for example, together with some external elements (not shown), forms the supply voltage $V_S$ as a function of the input voltage $V_{in}$ in such a way that the supply voltage $V_S$ is greater than the actual voltage $V_a$ or $V_b$ between the A-wire 11 and ground or B-wire 12 and ground by only a predetermined voltage value. This predetermined voltage value is adjusted to about 5 volts in this second embodiment, i.e., in a correct case (no overvoltage) the supply voltage $V_S$ is never greater than the voltage $V_a$ or $V_b$ plus about 5 volts.

In the second embodiment the voltage limiter is a gate-triggered thyristor 15, wherein the control input of the thyristor 15 is loaded with the reference voltage $V_{Ref}$ of the protective controller 5. The thyristor 15 therefore triggers if the voltage $V_a$ or $V_b$ on the A-wire 11 or B-wire 12 has a higher absolute value than the reference voltage $V_{Ref}$. More precisely, both the A-wire 11 and B-wire 12 usually have a negative potential. Since the thyristor 15 triggers if a voltage between the control input or gate and the cathode of the thyristor 15 is 0 volts or greater, the thyristor 15 triggers if the potential of the A-wire 11 or B-wire 12 is more negative than the potential at the control input of the thyristor 15 and thereby discharges the overvoltage on the A-wire 11 or B-wire 12.

According to the invention the reference voltage $V_{Ref}$ is selected not only as a function of the supply voltage $V_S$, in particular so as to be equal to the supply voltage $V_S$, as is the case in conventional communications interfaces, but also adjusted as a function of the measured current $I_a$ or $I_b$, the temperature T in the package and the line voltage $V_a$ or $V_b$. The following functionalities may therefore be implemented:

triggering of the thyristor 15 if either the line voltage $V_a$ or $V_b$ or the line current $I_a$ or $I_b$ of a wire 11, 12 exceeds predetermined thresholds.

triggering of the thyristor 15 if both the line voltage $V_a$ or $V_b$ and the line current $I_a$ or $I_b$ of a wire 11, 12 exceed predetermined thresholds.

temperature-dependent triggering behavior. The triggering behavior depends on the temperature measured in the package.

An additional advantage results in this case from the fact that both the SLIC 2 and the protective circuit 3 are located in the same package. Since the holding current of the thyristor 15 is selected so as to be greater than the maximum possible current $I_{lim, max}$ of the A-wire 11 or B-wire 12 and is typically highly temperature-dependent, a higher nominal holding current is required in a conventional communications line interface, in which the SLIC 2 and the protective circuit 3 are separate and therefore thermally separated elements, to guarantee that the holding current of the thyristor 15 is always greater than the maximum current $I_{lim, max}$, so the thyristor 15 returns to the high-resistance state following discharge of the overvoltage. In the embodiment according to the invention shown in FIG. 3 the temperature of the thyristor 15 and the SLICs 2 is the same, however, so even a temperature response from the maximum current $I_{lim, max}$ is equal to a temperature response of the holding current of the thyristor 15. In other words, the maximum possible current $I_{lim, max}$ and the actual holding current of the thyristor 15 change in the same way since the SLIC 2 and the thyristor 15 are exposed to the same temperature T. The nominal holding current of the thyristor 15 can therefore advantageously be selected so as to be much lower than is the case with conventional communications line interfaces, and this allows smaller dimensioning of the thyristor 15, whereby the space requirement and the production costs decrease.

A similar advantage applies to the integrated resistors RS. Since these integrated resistors RS usually have a positive temperature coefficient, the current $I_a$ or $I_b$ in the SLIC 2 decreases in the case of a high temperature T in the package and the protection against an overcurrent is improved. Since the SLIC 2 and the protective circuit 3 are at the same temperature T, the resistance value of the resistors RS can be selected so as to be lower than is the case with a conventional communications line interface since with a communications line interface 1 integrated in a package the case where the protective circuit 3 has a lower temperature than the SLIC 2 cannot occur. To compensate for this, in particular a higher resistance value has to be chosen for the resistors RS in the case of a conventional communications line interface, so the resistance value is appropriate even in the case of a "high temperature in the SLIC 2 and a low temperature in the protective circuit". Since the resistance value can be configured so as to be lower in a communications line interface 1 according to the invention, a power loss in the communications line during normal operation is reduced. The communications line interface 1 according to the invention can therefore more effectively meet an important demand, that a combined resistance of the communications line should be as low as possible, than a conventional communications line interface.

Furthermore, very effectively paired resistance values can advantageously be achieved for the two resistors RS by integrating the two resistors RS in a package, so a demand that the resistance values of the two resistors must not differ by more than about 0.1% can be more easily met.

FIG. 3 also shows a fuse or PTC (resistor with positive temperature coefficient) as a current limiting element 13. This current limiting element 13 further increases the protection against an overcurrent but is optional and can therefore also be omitted without critically reducing the overcurrent protection.

FIG. 4 shows a third embodiment according to the invention of a communications line interface 1. This third embodiment has the same basic construction as the first and second embodiments, so only the differences from the second embodiment will be described.

Instead of the thyristor 15 a diode 16 is used as the overcurrent protection in the third embodiment. The anode of the diode is connected to the supply voltage $V_S$ and the cathode to the A-wire 11 or B-wire 12. A current therefore flows through the diode 16 if the line voltage $V_a$ or $V_b$ has a more negative potential than the supply voltage $V_S$, so an overvoltage on the A-wire 11 or B-wire 12 is discharged.

The diode 16 is located parallel to the parasitic diodes, parasitic diodes being taken to mean diodes which actually unintentionally appear when producing the communications line interface.

As the main protective element the protective circuit 3 in the third embodiment comprises a switch 14 in the communications line 11, 12, which switch is controlled by a control signal 6 which is formed in the protective controller 5 from the above-mentioned parameters (line current $I_a$ or $I_b$, line voltage $V_a$ or $V_b$, temperature T, supply voltage $V_S$, parasitic current), so the communications line 11, 12 can be opened in the event of an overvoltage and/or overcurrent on the communications line 11, 12.

Instead of a thyristor or a diode, a varistor could also be used as the voltage-limiting element. A varistor is a voltage-dependent resistor in which the resistance becomes abruptly smaller above a certain threshold value.

Although in all illustrated embodiments the SLIC 2 operates as a voltage source, the SLIC can also be constructed as a current source, wherein in this case the input signal of the communications line interface, and therewith the SLICs, is an input current which is passed to the A-wire 11 and B-wire 12 intensified accordingly by the SLIC.

The present invention is preferably suitable for use in telephone systems in order, for example, to protect the physical interface between the telephone line and a codec from an overvoltage and/or overcurrent. Of course the invention is not restricted to this preferred field of application however but can also be used in other communication systems, with which all kinds of communication data is transmitted, to protect the interface between the communications line and a device connected thereto for processing the communication data, from an overvoltage and or an overcurrent.

What is claimed is:

1. A device for operating a transmission line, the device comprising:
    a line driver circuit, wherein the line driver circuit is configured to convert an input signal of the device into a current or a voltage for the transmission line;
    a protective circuit, the line driver circuit and the protective circuit being integrated in a common package;
    a sensor configured to measure a plurality of parameters, wherein one of the parameters is a temperature in the package or a parasitic current in the package; and
    a controller configured to calculate a control signal based on the plurality of parameters
    wherein the protective circuit is configured to prevent an overvoltage and/or overcurrent on the transmission line based on the control signal.

2. The device according to claim 1, wherein another of the parameters is selected from the group consisting of:
    at least one voltage measured with respect to the transmission line;
    at least one current measured with respect to the transmission line; and
    at least one power loss measured with respect to the transmission line, the power loss being determined from a current measured with respect to the transmission line and a voltage measured with respect to the transmission line;
    wherein the protective circuit is configured to prevent the overvoltage and/or the overcurrent on the transmission line as a function of the at least one parameter.

3. The device according to claim 1, wherein the sensor also detects at least one voltage measured with respect to the transmission line, wherein the at least one voltage that is measured with respect to the transmission line comprises a voltage between an A-wire of the transmission line and ground and/or a voltage between a B-wire of the transmission line and ground, and wherein the protective circuit is configured to prevent the overvoltage and/or the overcurrent on the transmission line as a function of the at least one voltage.

4. The device according to claim 1, wherein the. sensor also detects at least one current measured with respect to the transmission line, wherein the at least one current measured with respect to the transmission line is a current on an A-wire of the transmission line and/or a current on a B-wire of the transmission line and wherein the protective circuit is configured to prevent the overvoltage and/or the overcurrent on the transmission line as a function of the at least one current.

5. The device according to claim 1, wherein the sensor also detects at least one power loss measured with respect to the transmission line, the power loss being determined from a current measured with respect to the transmission line and a voltage measured with respect to the transmission line, wherein the at least one power loss is calculated as:
- a product of a voltage between an A-wire of the transmission line and ground and a current on the A-wire; or
- a product of a voltage between a B-wire of the transmission line and ground and a current on the B-wire; or
- a product of a difference from the voltage between the A-wire and ground and the voltage between the B-wire and ground and a difference between the current on the A- wire and the current on the B-wire.

6. The device according to claim 1, wherein the protective circuit comprises at least one current limiter that limits the current on the transmission line, and/or at least one voltage limiter that limits the voltage between the transmission line and ground, and wherein the protective circuit is configured such that the at least one current limiter and/or the at least one voltage limiter is activated as a function of the at least one parameter.

7. The device according to claim 1, wherein the protective circuit comprises at least one current limiter that limits the current on the transmission line and wherein the protective circuit is configured such that the at least one current limiter is activated as a function of the at least one parameter, the at least one current limiter comprising a device selected from the group consisting of a fuse, a resistor with a positive temperature coefficient and a switch.

8. The device according to claim 1, wherein the protective circuit comprises at least one current limiter that limits the current on the transmission line and wherein the protective circuit is configured such that the at least one current limiter is activated as a function of the at least one parameter, the at least one current limiter comprising a device selected from the group consisting of a varistor, a thyristor and a diode.

9. The device according to claim 1, wherein the protective circuit comprises a thyristor arranged between the transmission line and a ground node, the thyristor being constructed in such a way that its holding current is greater than a maximum current fed in from the line driver circuit to the transmission line.

10. The machine according to claim 1, wherein the protective circuit comprises a first ohmic resistor for an A-wire of the transmission line and a second ohmic resistor for a B-wire of the transmission line, the first and second ohmic resistors to limit a current on the A-wire and on the B-wire, wherein a resistance value of the first resistor is equal to a resistance value of the second resistor, and wherein the first resistor and the second resistor each have a positive temperature coefficient.

11. The device according to claim 1, wherein the protective circuit and the line driver circuit are integrated on a single semiconductor chip.

12. A device for operating a transmission line, the device comprising:
- a line driver circuit to convert an input signal of the device into a current or a voltage for the transmission line;
- a protective circuit to prevent an overvoltage and/or overcurrent on the transmission line, the line driver circuit and the protective circuit being integrated in a common package;
- a sensor to measure a plurality of parameters with respect to the transmission line and/or with respect to the common package, the sensor integrated in the common package, wherein the sensor detects at least one parameter selected from the group consisting of:
  - a temperature in the package; and
  - a parasitic current in the package;
- a controller to calculate a variable reference voltage based on the plurality of parameters, the protective circuit prevents the overvoltage and/or overcurrent on the transmission line based on the variable reference voltage; and
- a supply circuit to supply the line driver circuit with a supply voltage, wherein the supply circuit is integrated in the common package.

13. The device according to claim 12, wherein the protective circuit comprises at least one current limiter that limits the current on the transmission line, and/or at least one voltage limiter that limits the voltage between the transmission line and ground, and wherein the protective circuit is constructed in such a way that the at least one current limiter and/or the at least one voltage limiter is activated as a function of the at least one parameter.

14. The device according to claim 12, wherein the protective circuit comprises a thyristor arranged between the transmission line and a ground node, the. thyristor having a holding current that is greater than a maximum current fed in from the line driver circuit to the transmission line.

15. The device according to claim 14, wherein the thyristor triggers as a function of the supply voltage, the voltage between an A/B-wire and ground, the current on the A/B-wire and a temperature in the package.

16. The device according to claim 12, wherein the protective circuit comprises a first ohmic resistor for an A-wire of the transmission line and a second ohmic resistor for a B-wire of the transmission line, the first and second ohmic resistors limiting a current on the A-wire and on the B-wire, wherein a resistance value of the first resistor is equal to a resistance value of the second resistor, and wherein the first resistor and the second resistor have a positive temperature coefficient.

17. The device according to claim 12, wherein the supply circuit, the line driver circuit and the protective circuit are all integrated on a single semiconductor chip.

18. A method for operating a transmission line, the method comprising:
- receiving an input signal;
- converting the input signal into a current or a voltage for a transmission line;
- measuring a plurality of parameters, wherein one of the parameters comprises a temperature measured in a package or a parasitic current in the package;
- calculating a control signal as a function of the parameters; and
- driving the current or the voltage onto the transmission line, including preventing an overvoltage and/or an overcurrent on the transmission line based on a threshold current and/or a threshold voltage relative to the control signal, wherein all circuitry that causes the converting, the measuring, the calculating and the driving is integrated in the package.

19. The method according to claim 18, wherein another parameter is selected from the group consisting of:
- at least one voltage measured with respect to the transmission line;
- at least one current measured with respect to the transmission line; and
- at least one power loss measured with respect to the transmission line, the power loss being determined from a current measured with respect to the transmission line and a voltage measured with respect to the transmission line.

20. The method according to claim 18, wherein the circuitry that causes the converting and the driving is integrated in the single package with a supply circuit.

21. The method according to claim 18, further comprising adjusting a supply voltage as a function of the input signal, wherein the supply voltage is never greater by a predetermined voltage value than a voltage between the transmission line and ground.

22. The method according to claim 18, wherein all circuitry that causes the converting and the driving is integrated in a single semiconductor chip.

23. A communications system comprising:

a transmission line; and a device for operating the transmission line, the device comprising:

a line driver circuit, wherein the line driver circuit is constructed in such a way that the line driver circuit converts an input signal of the device into a current or a voltage for the transmission line;

a sensing circuit configured to measure a plurality of parameters with respect to the transmission line and/or the common package, wherein one of the parameters comprises a temperature measured in a package or a parasitic current in the package;

a controller configured to calculate a control signal based on the plurality of parameters; and a protective circuit wherein the protective circuit is constructed in such a way that the protective circuit prevents an overvoltage and/or overcurrent on the transmission line based on a threshold current and/or a threshold voltage relative to the control signal, and wherein the line driver circuit and the protective circuit are integrated in a common package.

* * * * *